(12) United States Patent
Yen et al.

(10) Patent No.: US 6,547,499 B2
(45) Date of Patent: Apr. 15, 2003

(54) PRESTRESSING DEVICE FOR A MECHANICAL FINISHING DEVICE

(75) Inventors: Kelson Yen, Taichung (TW); Chen-Chien Hsu, Taichung (TW)

(73) Assignee: Victor Taichung Machinery Works, Co., Ltd., Taichung (TW)

( * ) Notice: Subject to any disclaimer, the term of this patent is extended or adjusted under 35 U.S.C. 154(b) by 0 days.

(21) Appl. No.: 09/892,118

(22) Filed: Jun. 25, 2001

(65) Prior Publication Data

US 2002/0197125 A1 Dec. 26, 2002

(51) Int. Cl.[7] .............. B23C 1/00; B23B 17/00; E04C 1/10

(52) U.S. Cl. ............ 409/235; 248/639; 408/234; 409/238

(58) Field of Search ............... 409/238, 239, 409/235; 408/234; 100/214; 248/639, 678; 52/584

(56) References Cited

U.S. PATENT DOCUMENTS

| | | | | |
|---|---|---|---|---|
| 3,097,568 A | * | 7/1963 | Kampmeier | 409/239 |
| 3,656,860 A | * | 4/1972 | Neuman | 408/234 |
| 3,800,636 A | * | 4/1974 | Zagar | 29/452 |
| 3,800,695 A | * | 4/1974 | Jonsson et al. | 100/214 |
| 3,884,142 A | * | 5/1975 | Jonsson | 100/214 |
| 4,336,677 A | * | 6/1982 | Ossbahr | 248/639 |
| 5,207,872 A | * | 5/1993 | Jansson | 162/272 |
| 5,297,907 A | * | 3/1994 | Strait et al. | 408/234 |

FOREIGN PATENT DOCUMENTS

| | | | | |
|---|---|---|---|---|
| DE | 3626929 | * | 2/1988 | 409/238 |

* cited by examiner

*Primary Examiner*—William Briggs
(74) *Attorney, Agent, or Firm*—David A. Belasco; Belasco Jacobs & Townsley, LLP

(57) ABSTRACT

A prestressing device for a mechanical component of a mechanical finishing device has at least one rigid prestressing unit mounted in the mechanical component. This can provide a prestressing tension to the mechanical component. The bending and the deformation of the mechanical component can be prevented. The useful life of the mechanical finishing device is prolonged.

4 Claims, 6 Drawing Sheets

PRESTRESSING DEVICE FOR A MECHANICAL FINISHING DEVICE

BACKGROUND OF THE INVENTION

1. Field of the Invention

The present invention relates to a prestressing device, and more particularly to a prestressing device for a mechanical component of a mechanical finishing device to provide a prestressing tension to the mechanical component.

2. Description of Related Art

With reference to FIG. 6, a mechanical finishing device like a lathe, a milling machine or a drilling machine, etc. substantially comprises a base (30), a moving base (40), a work table (50), a column (10) and a tool-head stand (20). The moving base (40) is mounted on a pair of fore and aft tracks (31) on the base (30) and is moveable in a for and aft horizontal direction. The work table (50) is mounted on a pair of side-to-side tracks (41) on the moving base (40) moveably in a side-to-side horizontal direction perpendicular to the fore and aft horizontal direction. Consequently, an object (not shown) can be secured on the work table (50) and moved to a desired position under the tool head stand (20) by means of the movements of the moving base (40) and the work table (50).

The column (10) is secured vertically to one end of the top of the base (30). The tool-head stand (20) is moveable mounted on a longitudinal track on the column (10). Tool heads like milling cutters or bits are rotatably mounted on the tool-head stand (20) to machine the object on the work table (50).

The mechanical components (10, 20, 30, 40, 50) of the mechanical finishing device are always made with casting processes and are extremely heavy. When one of the moveable mechanical components (20, 40, 50) moves to the distal end of the supporting mechanical component (10, 30, 40) on which it is mounted, for example the work table (50) moves to the distal end of the moving base (40) or the tool-head stand (20) moves to the uppermost end of the column (10), the supporting mechanical component (10, 30, 40) is easily bent due to the huge weight of the moving mechanical component (20, 40, 50). In especially, when the mechanical finishing device is used to machine an object with a huge weight, the mechanical components (10, 20, 30, 40, 50) of the mechanical finishing device are easily bent due to the weight of the moving mechanical components (20, 40, 50) and the object on which the mechanical finishing device is working. The mechanical components (10, 20, 30, 40, 50) of the mechanical finishing device are easily deformed and damaged, and the useful life of the mechanical finishing device is shortened. In addition, to enhance the structural strength of each mechanical component (10, 20, 30, 40, 50) to prevent deformation, the thickness of the mechanical component (10,20,30,40,50) is enlarged. However, as the weight of the mechanical components (10, 20, 30, 40, 50) is increased, conventional techniques for preventing deformation become less effective.

To overcome the shortcomings, the present invention provides a prestressing structure to mitigate or obviate the aforementioned problems.

SUMMARY OF THE INVENTION

The main objective of the invention is to provide a prestressing device for a mechanical component of a mechanical finishing device to provide a prestressing tension on the mechanical component. The prestressing device has at least one rigid prestressing unit mounted in the mechanical component to provide a prestressing tension to the mechanical component. This can prevent the mechanical component from being bent or deformed when a large force is applied to the mechanical component. The useful life of the mechanical finishing device is prolonged.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 5, a prestressing device (60) in accordance with the present invention for a mechanical component of a mechanical finishing device comprises at least one rigid prestressing unit (601, 602, 603, 604, 605, 606, 607). The prestressing unit (601, 602, 603, 604, 605, 606, 607) can be a steel wire, a chain or a threaded rod.

Figure 1:
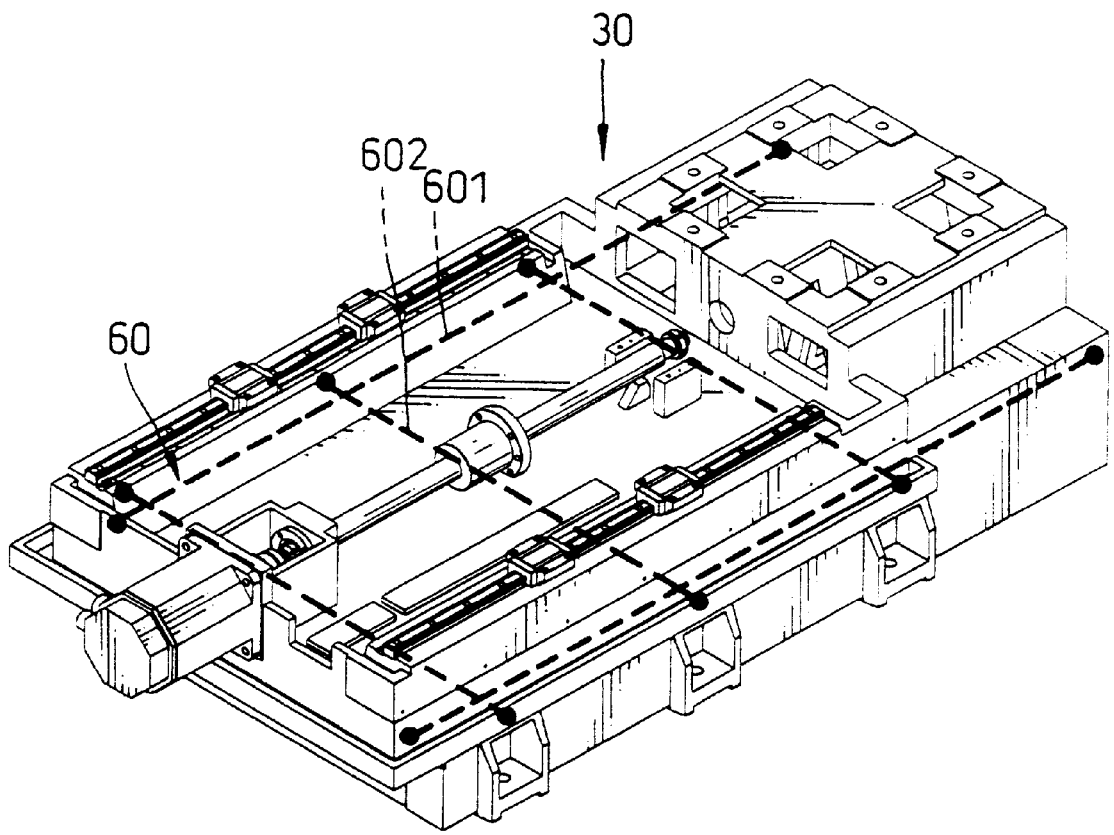
FIG. 1 is a perspective view of a base of a mechanical finishing device with a prestressing device in accordance with the present invention.

With reference to FIG. 1, the prestressing device (60) applied to the base (30) of the mechanical finishing device comprises two longitudinal prestressing units (601) and three lateral prestressing units (602). Each prestressing unit (601, 602) is securely mounted in a recess defined in the base (30). Each end of each prestressing unit (601, 602) is attached to the inner surface of the recess with a fastener like a screw, a hook, an eye bolt, a pressure clamp, a ratchet or the like. Each longitudinal prestressing unit (601) is mounted in one of side of the base (30) and between two ends of the base (30). Each lateral prestressing unit (602) is attached between two sides of the base (30). Consequently, the longitudinal prestressing units (601) provide a longitudinal prestressing tension to the base (30), and the lateral prestressing units (602) provide a lateral prestressing tension to the base (30).

When a huge force is applied to one distal end of the base (30), a cantilever bends or deforms sets up tensile and compression forces in the base (30) that exceed the tensile and compression strength of the material. The prestressing units (601,602) augments the tensile strength of the material of the base (30). The augmentation of the tensile strength of the material makes the base (30) more resistant to bending or deformation. Consequently, the prestressing units (601, 602) can assist the structure of the base (30) in resisting the force. This can prevent the base (30) from being bent or deformed. The useful life of the base (30) is prolonged.

Figure 2:
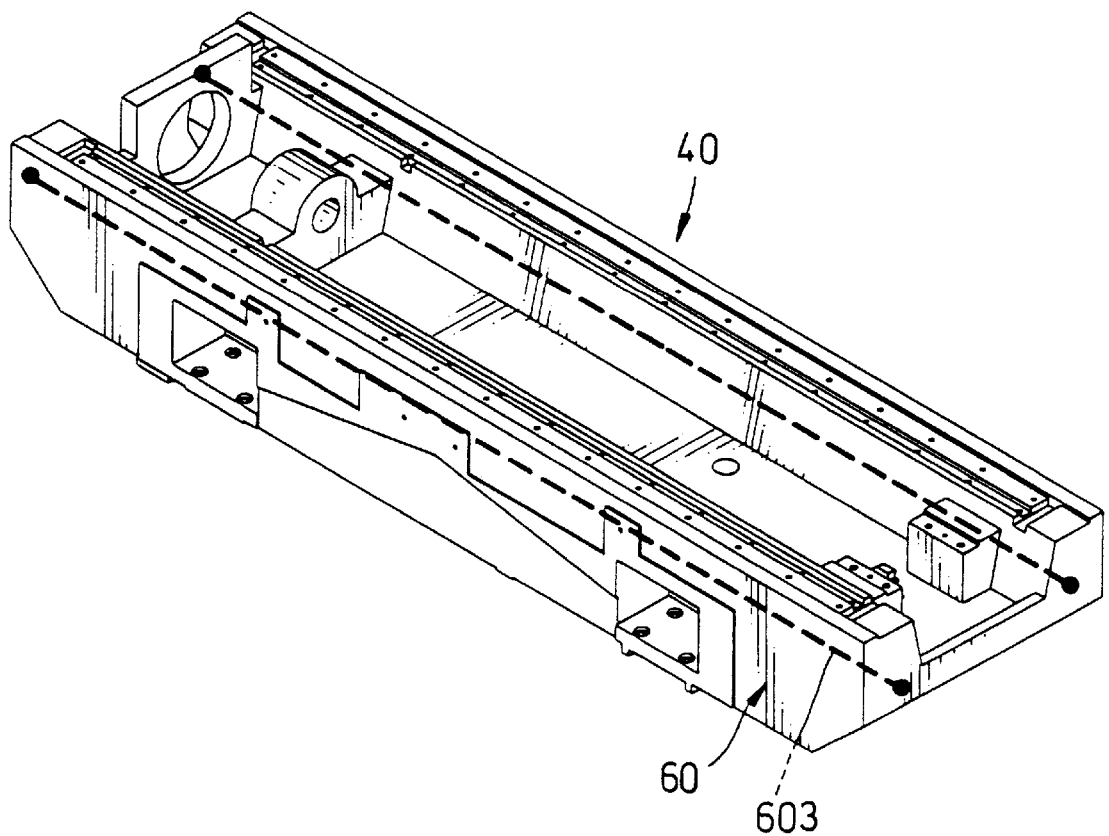
FIG. 2 is a perspective view of a moving base of a mechanical finishing device with a prestressing device in accordance with the present invention.

With reference to FIG. 2, the prestressing device (60) used with the moving base (40) of the mechanical finishing device comprises two longitudinal prestressing units (603). Each prestressing unit (603) is securely mounted in a recess defined in the moving base (40). Each end of each prestressing unit (603) is attached to the inner surface of the recess with a fastener like a screw, a hook, an eye bolt, a pressure clamp, a ratchet or the like. Each prestressing unit (603) is mounted in one of side of the moving base (50) between two ends of the moving base (50). Consequently, the longitudinal prestressing units (603) can provide a longitudinal prestressing tension to the moving base (40). This can prevent the moving base (40) from being bent when a huge force is applied to one distal end of the moving base (40).

Figure 3:
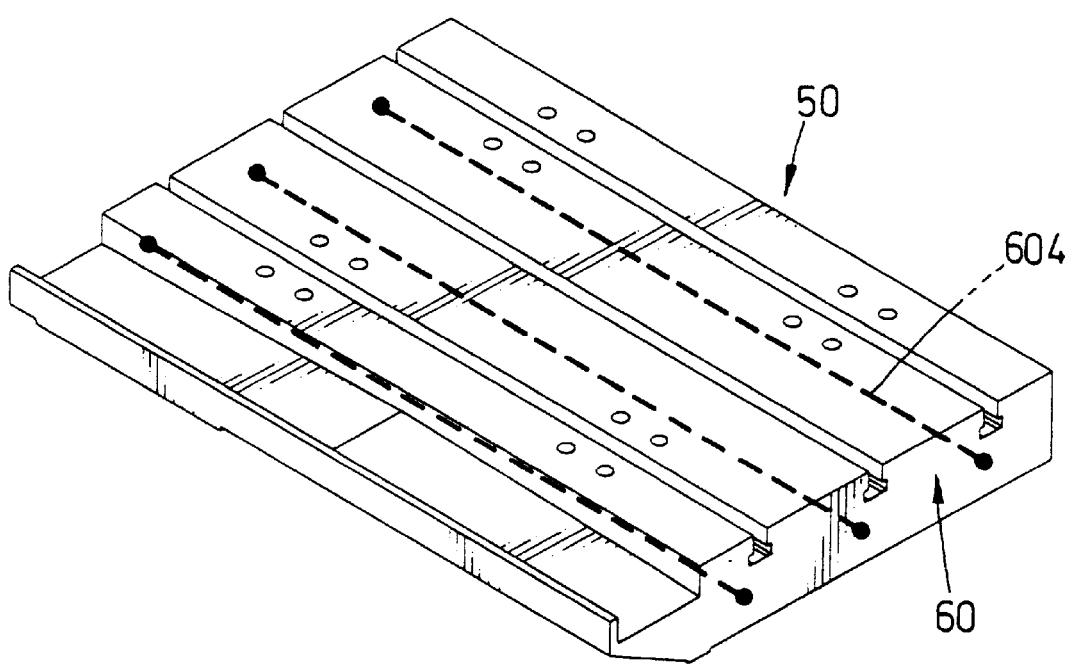
FIG. 3 is a perspective view of a work table of a mechanical finishing device with a prestressing device in accordance with the present invention.

With reference to FIG. 3, the prestressing device (60) used with the work table (50) of the mechanical finishing device comprises three longitudinal prestressing units (604). Each prestressing unit (604) is securely mounted in a recess defined in the work table (50). Each end of each prestressing unit (604) is attached to the inner surface of the recess with a fastener like a screw, a hook, an eye bolt, a pressure clamp, a ratchet or the like. Each longitudinal prestressing unit (604) is mounted between two ends of the work table (50). Consequently, the longitudinal prestressing units (604) can provide a longitudinal prestressing tension to the work table (50). When an object to be machined with a huge weight is put on one distal end of the work table (50), the prestressing units (604) can assist the structure of the work table (50) in resisting the force of gravity applied by the object. This can prevent the work table (50) from being bent or deformed due to the weight of the object.

Figure 4:
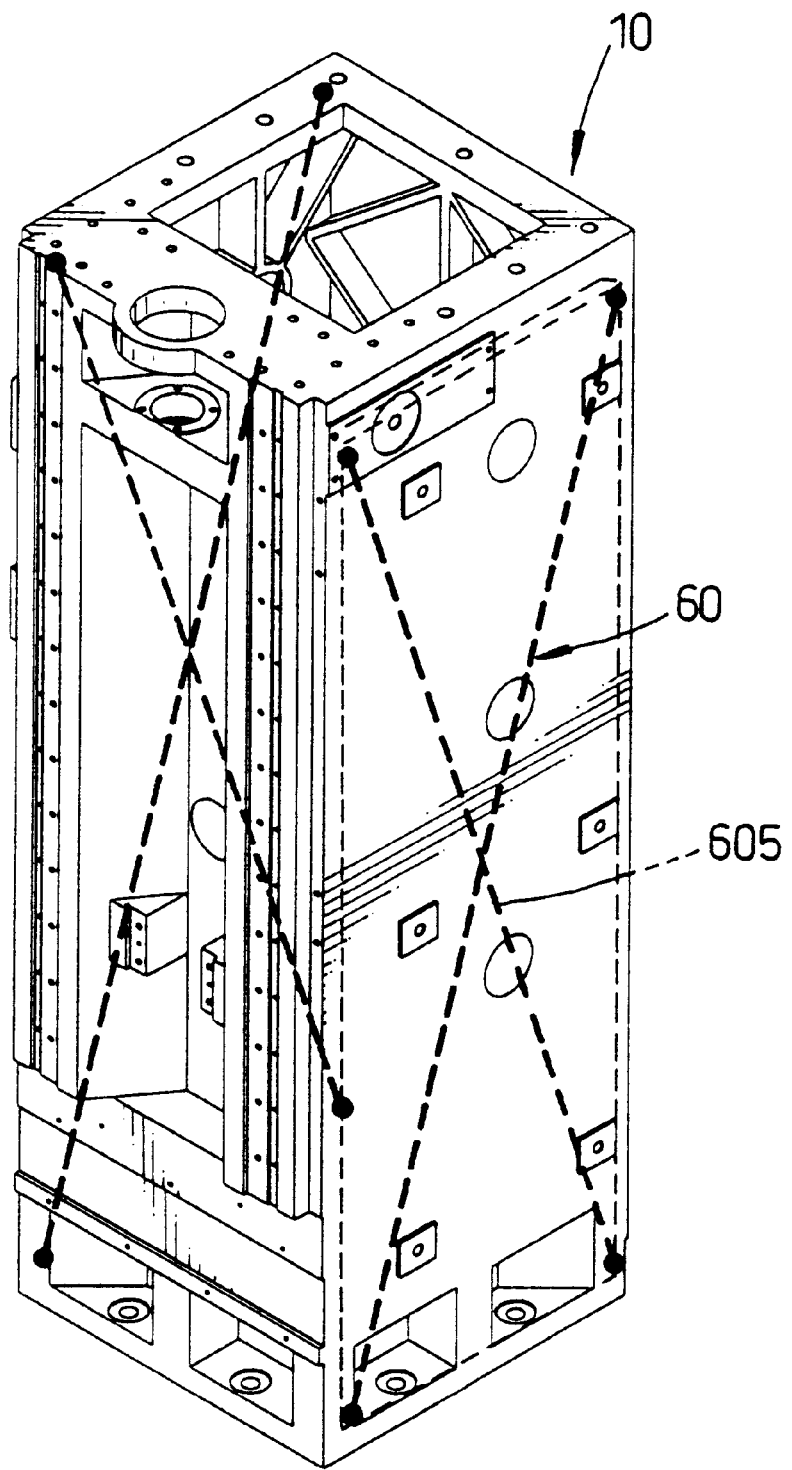
FIG. 4 is a perspective view of a column of a mechanical finishing device with a prestressing device in accordance with the present invention.
Figure 6:
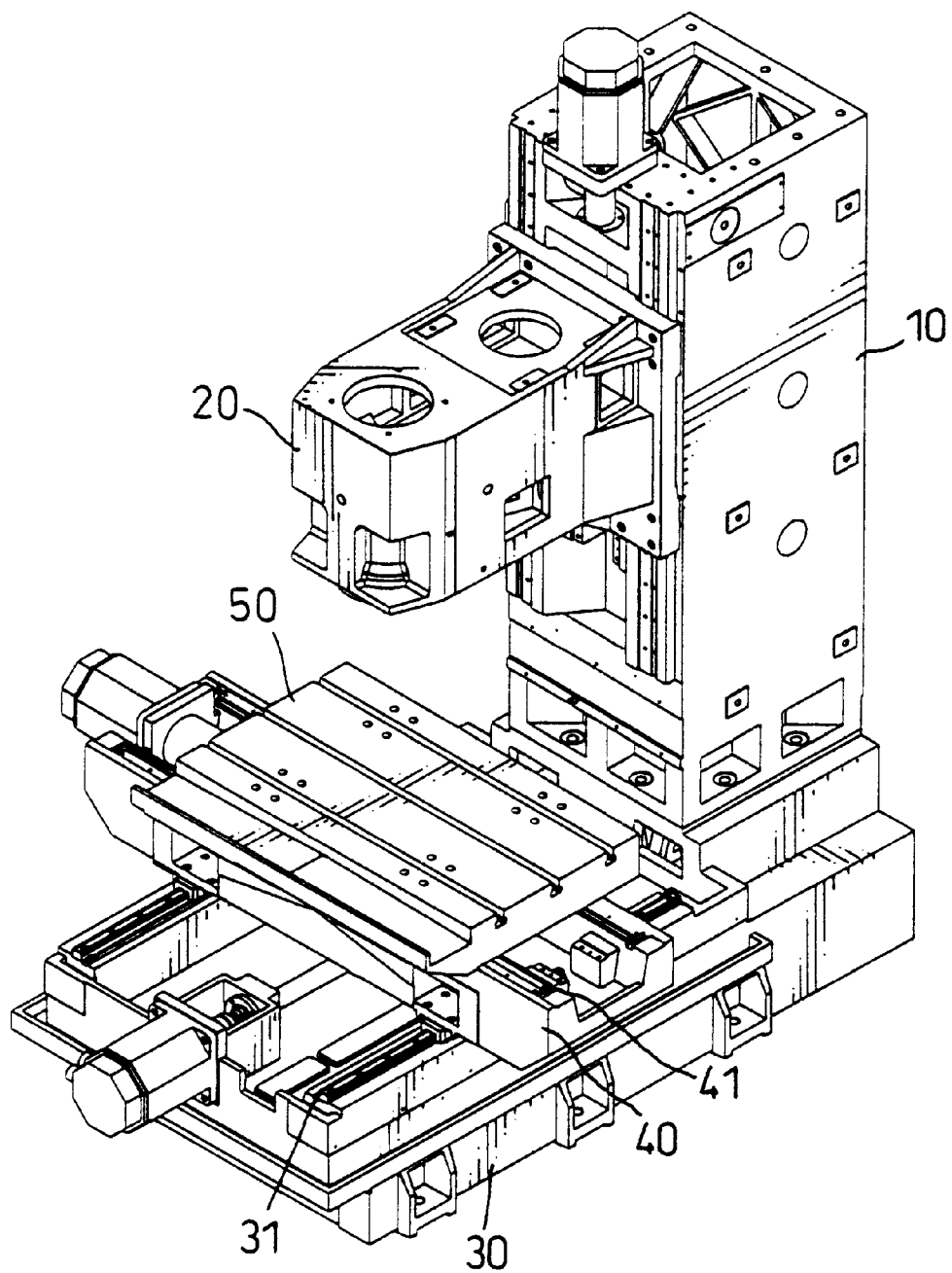
FIG. 6 is a perspective view of a conventional mechanical finishing device composed of multiple mechanical components in accordance with the prior art.

With reference to FIG. 4, the prestressing device (60) used with the column (10) of the mechanical finishing device that has a top and a bottom where the prestressing device (60) comprises two prestressing units (605) mounted on opposite sides of the column (10). Each prestressing unit (605) comprises two prestressing elements (not numbered) that crisscross each other. Each prestressing element is securely received in a recess defined in the column (10). Each end of each prestressing element is attached to the inner surface of the recess with a fastener like a screw, a hook, an eye bolt, a pressure clamp, a ratchet or the like. Each prestressing unit (605) is mounted between the top and the bottom of the column (10). Consequently, the prestressing units (605) can provide a longitudinal prestressing tension to the column (10). When the tool-head stand (20) (as shown in FIG. 6) with tools moves to a distal end of the column (10), the prestressing units (605) can assist the structure of the base in resisting the force applied by the tool-head stand (20). This can prevent the column (10) from being bent or deformed.

Figure 5:
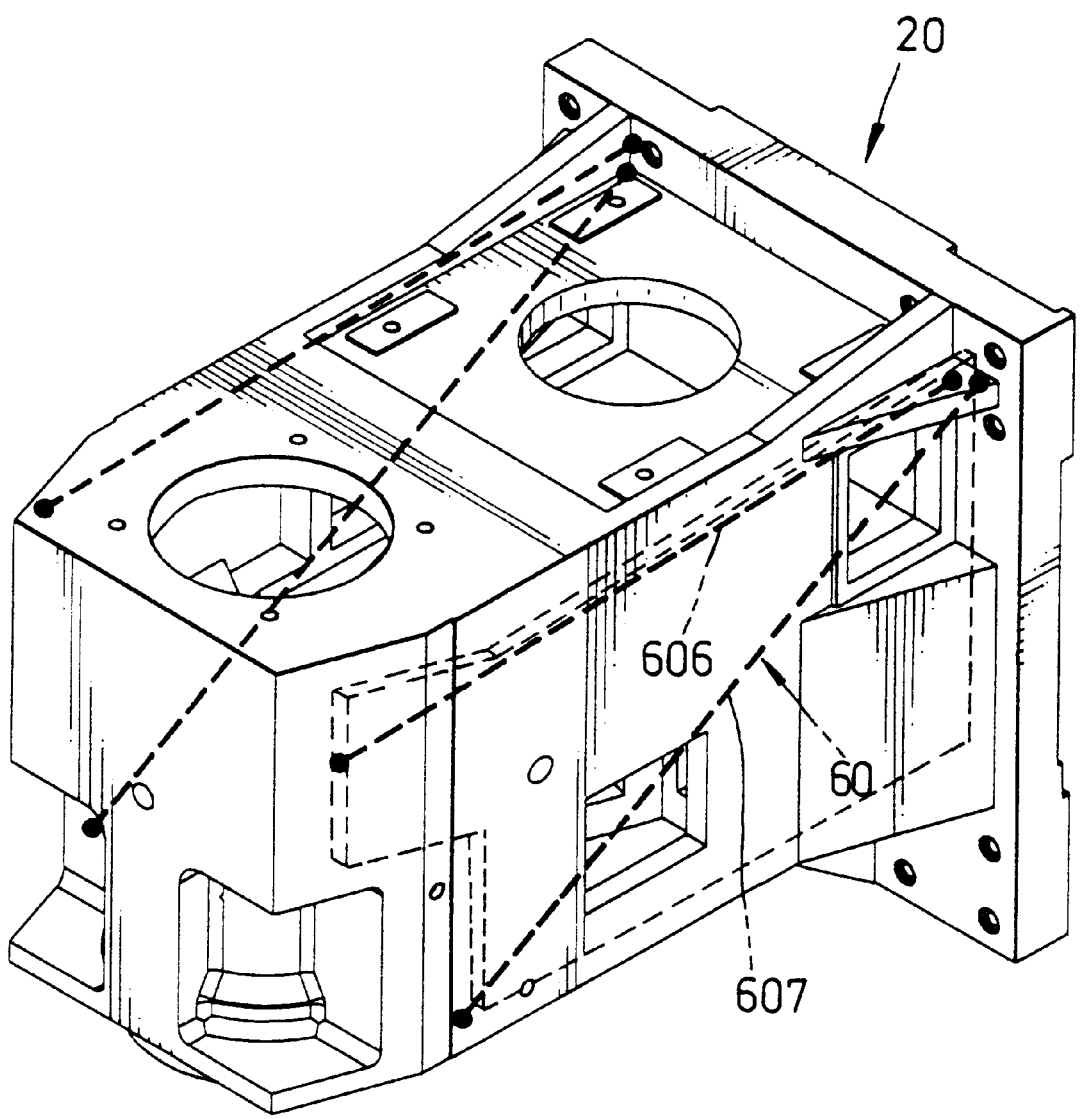
FIG. 5 is a perspective view of a tool-head stand of a mechanical finishing device with a prestressing device in accordance with the present invention.

With reference to FIG. 5, the prestressing device (60) used with the tool-head stand (20) of the mechanical finishing device comprises two prestressing units (606, 607) arranged on opposite sides of the tool-head stand (20). Each prestressing unit (606, 607) is securely mounted in a recess defined in the stand (20). Each end of each prestressing unit (606, 607) is secured to the inner surface of the recess with a fastener like a screw, a hook, an eye bolt, a pressure clamp, a ratchet or the like. One of the prestressing units (606) on each side of the stand is mounted between two ends of the stand (20), the other prestressing unit (607) is diagonally mounted in the side of the stand (20). Accordingly, the prestressing units (606, 607) can provide a prestressing tension to the stand (20). When a huge force is applied to one distal end of the stand (20), the prestressing units (606, 607) can assist the structure of the stand (20) to resist the force. This can prevent the stand (20) from being bent or deformed.

When the prestressing units (601, 602, 603, 604, 605, 606, 607) loosen after a long use due to stretching or loosening of the fastener and the prestressing tension reduces, prestressing tension can be restored by tightening the loose prestressing units (601, 602, 603, 604, 605, 606, 607).

Because the prestressing device (60) can assist the structure of the mechanical components of the mechanical finishing device in resisting the force applied to the mechanical components, the thickness of the mechanical components can be reduced rather than to be enlarged. The weight of the mechanical components can be reduce, such that the force applied to the other mechanical components is also reduced. The useful life of the mechanical finishing device is prolonged, and the cost for manufacturing the mechanical finishing device is reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A prestressing device for a mechanical finishing device having multiple components including a base, a moving base, a work table, a column and a tool-head stand, the prestressing device comprising:

multiple rigid prestressing units adapted to be mounted in the mechanical finishing device to provide prestressing tension to the mechanical finishing device; and a recess adapted to be defined in each component of the mechanical finishing device and receiving at least one of the prestressing units, wherein the rigid prestressing units comprise:

two first longitudinal prestressing units and three first lateral prestressing units adapted to be applied to the base of the mechanical finishing device, wherein each first longitudinal prestressing unit is adapted to be mounted in one of the sides of the base between two ends of the base and each first lateral prestressing unit is adapted to be mounted between two sides of the base;

two second longitudinal prestressing units adapted to be applied to the moving base of the mechanical finishing device, wherein each second longitudinal prestressing unit is adapted to be mounted in one of the sides of the moving base between two ends of the moving base;

three third longitudinal prestressing units adapted to be applied to the work table of the mechanical finishing device, wherein each third longitudinal prestressing unit is adapted to be mounted between two ends of the work table;

two fourth prestressing units adapted to be applied to the column of the mechanical finishing device, wherein each fourth prestressing unit is adapted to be mounted cross a top and a bottom of the column; and two fifth prestressing units adapted to be arranged in each opposite sides of the tool-head stand of the mechanical finishing device, wherein one of the fifth prestressing units is adapted to be mounted between two ends of the tool-head stand and the other fifth prestressing unit is adapted to be diagonally mounted in the side of the tool-head stand.

2. The prestressing device as claimed in claim 1, wherein the at least one prestressing unit is a steel wire.

3. The prestressing device as claimed in claim 1, wherein the at least one prestressing unit is a chain.

4. The prestressing device as claimed in claim 1, wherein the at least one prestressing unit is a threaded rod.

* * * * *